United States Patent [19]

Junker

[11] Patent Number: 5,595,582
[45] Date of Patent: Jan. 21, 1997

[54] FILTER INSERT

[76] Inventor: Jurgen Junker, Kurpfalzstr. 60, D-74889 Sinsheim, Germany

[21] Appl. No.: 298,090

[22] Filed: Aug. 1, 1994

[30] Foreign Application Priority Data

Sep. 1, 1993 [DE] Germany .......... 43 29 367.0

[51] Int. Cl.$^6$ .................. B01D 29/07
[52] U.S. Cl. .......... 55/497; 55/521; 55/DIG. 12
[58] Field of Search ............ 55/378–380, 497, 55/499, 521, 302, DIG. 12; 210/493.1, 493.3, 493.5

[56] References Cited

U.S. PATENT DOCUMENTS

| | | | |
|---|---|---|---|
| 2,853,154 | 9/1958 | Rivers | 55/378 X |
| 4,193,780 | 3/1980 | Cotton, Jr. et al. | 55/DIG. 12 |
| 4,225,328 | 9/1980 | Stiehl | 55/380 X |
| 4,312,648 | 1/1982 | Day | 55/380 X |
| 4,445,915 | 5/1984 | Robinson | 55/378 |
| 4,539,025 | 9/1985 | Ciliberti et al. | 55/378 X |
| 4,925,561 | 5/1990 | Ishii et al. | 55/DIG. 12 |
| 5,298,044 | 3/1994 | Sutton et al. | 55/378 |

FOREIGN PATENT DOCUMENTS

| | | |
|---|---|---|
| 1536928 | 8/1973 | Germany . |
| 2819177 | 5/1982 | Germany . |

*Primary Examiner*—Richard L. Chiesa
*Attorney, Agent, or Firm*—Lowe, Price, LeBlanc & Becker

[57] ABSTRACT

A filter insert, which combines high mechanical load-bearing capacity with good characteristics as regards the shedding of filter cake, has lateral filter walls which are folded in planar or zigzag manner and which are connected to horizontal wall components in mechanically loadable and airtight manner. The unit so obtained is in turn connected in tight and mechanically loadable manner to a top section by which the filter insert is capable of being attached to the perforated plate of a filter casing.

13 Claims, 8 Drawing Sheets

FILTER INSERT

BACKGROUND OF THE RELATED ART

Field of the Invention

The invention relates to a filter insert, especially such an insert which can be attached to a perforated plate of a filter casing.

Filter inserts of relevant type have flexible filter material which acts as the active filter component, the filter material being held stretched out by a supporting body. Such filter inserts are predominantly installed into a filter casing in vertical orientation, so that a filter cake accumulating on the outside of the filter material drops off easily when the inside of the filter insert is subjected to pressure.

Filter inserts are also known in which the actual filter element is folded in zigzag manner. Such filters are also used predominantly in vertical orientation, since otherwise a filter cake which has built up on the outside is no longer detached in the course of backflushing or is detached only to a limited extent, at least over a large part of the periphery of the filter.

SUMMARY OF THE INVENTION

The present invention provides a filter insert which comprises a pair of lateral filter walls, and relatively rigid walls, which are connected to one another to facilitate loading of the filter into filtration apparatus.

Accordingly, in one aspect, the invention provides a filter insert which comprises:
(a) a top section capable of being attached to a perforated plate of a filter casing;
(b) a pocket-shaped filter section fixed tightly against the top section, the filter section comprising (i) two lateral filter walls, (ii) an upper inherently rigid wall component, (iii) a lower inherently rigid wall component, and (iv) a rear inherently rigid wall component;
the filter walls and the wall components being connected to one another and to the top section in a fluid tight and mechanically loadable manner.

The filter element of the invention does not require a supporting construction. This avoids the possibility of damage to the filter element which can result from relative movement between filter element and an associated supporting construction. Furthermore, the filter element of the invention can provide effective shedding of a filter cake, even when installed horizontally.

The filter walls of the insert have a configuration that is selected from zigzag folds and planar.

With the filter insert according to the invention the filter walls, together with the inherently rigid wall components, provide a robust construction with load-bearing capacity. The filter cake can easily drop down from the folded filter walls. Solids are deposited only to a slight extent on the inherently rigid wall components, and this is not unfavourable as regards the filter characteristics and the shedding of filter cake.

Preferably, the inherently rigid wall components are made from a process which comprises at least one of injection moulding and casting, especially from synthetic material. This has the advantage that production costs can be maintained low, and also that solid particles slip off easily.

Preferably, the filter insert includes at least one central internal component arranged between the upper inherently rigid wall component and the lower inherently rigid wall component, which supports the filter walls. This feature permits the use of high filter walls while maintaining a high degree of mechanical stability, both in the case of application of low pressure to the filter insert in the course of filtration and in the case of application of excess pressure to the filter insert in the course of backflushing with a view to detaching the filter cake. The central component is preferably arranged substantially parallel to the lower wall component.

Preferably, the wall components and the central components are made together, for example by injection moulding or casting. The wall components or the central components or both can be moulded or cast directly onto the filter walls. This has the advantage that a tight connection can be made simply.

Preferably, at least some of the wall components have edge faces whose configurations match those of the filter walls which they abut. For example, when the filter walls have a zigzag configuration, the configuration of some of the edge faces of the wall components which engage the filter walls is such that they can engage the zigzag edges of the walls. In another arrangement, the filter might be substantially planar at least at its edges, and the edges of the wall components which engage the filter walls will be substantially straight. The edge faces of the wall components can conveniently be attached to the filter walls by one of bonding, welding or casting in place.

These arrangements permit the manufacture of filter inserts of highly variable dimensions with the use of continuous standard material for the manufacture of the upper and the lower wall components and, where necessary, the central internal components.

Preferably, an aperture is formed in the top section, the aperture leading to the interior of the filter section and being tapered outwardly with increasing distance from the filter section. This permits advantageous flow conditions in the top section. The aperture preferably has substantially planar divergent lateral wall surfaces.

Preferably, the wall component remote from the top section bears an engaging element, and the filter casing bears a corresponding element which can engage the element on the top section, the elements cooperating to support the end of the filter insert remote from the perforated plate. This enables the free end of the filter insert to be retained reliably, even in the case where the insert is very long.

Preferably, the filter insert includes circumferential sealing means provided on one of the end faces of the top section. This facilitates installation of the filter insert and good sealing effect within a filter casing.

DETAILED DESCRIPTION OF THE PREFERRED EMBODIMENTS

Figure 1:
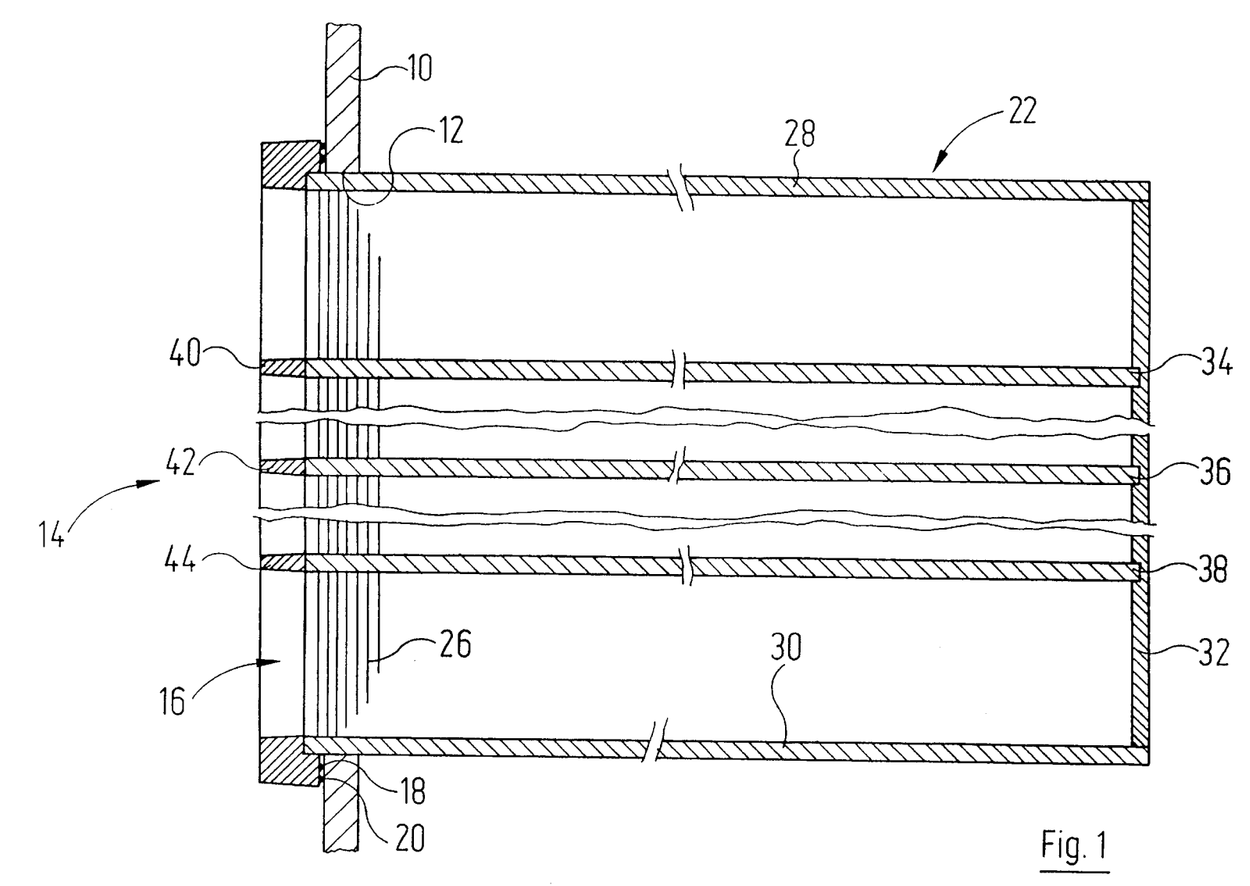
FIG. 1 is a vertical section view through a filter insert for a dust filter and a section of a perforated plate retaining the same in a filter casing.

In FIG. 1 a perforated plate designated as 10 is arranged oriented vertically in a filter casing (not reproduced in the drawing) where it separates the clean side (on the left) from the dust side (on the right).

The perforated plate 10 is substantially rectangular and has a large number of rectangular apertures 12 arranged in a rectangular grid, each of which is capable of receiving a filter insert designated overall as 14.

Each of the filter inserts 14 has a top section 16 which is an injection-moulded component and bears on its end face shown on the right in FIG. 1 two circumferential sealing ribs 18, 20 in the vicinity of the edge.

The top section 16 is injection-moulded onto a filter section designated overall as 22. The latter has two lateral, vertical filter walls 24, 26 which are folded in zigzag manner, whereby the fold lines also run vertically.

The filter walls 24, 26 may be a fabric, fleece or needled felt consisting of fibres of the materials listed below: polyethylene, polypropylene, polyester, polyamide, polyacrylonitrile, aramides, polyphenylene sulphides, polyimides, polyether ketones, polytetrafluoroethylene, glass fibres, fibres of high-grade steel, ceramic fibres. Where necessary these fibres are connected by suitable binders to form a porous structure which is capable of acting as a filter. The filter walls 24, 26 gain their mechanical strength by virtue of their inherent rigidity and the zigzag folding.

The ends of the filter walls 24, 26 located at the top and at the bottom are injection-moulded into the lateral end sections of an upper wall component 28 and a lower wall component 30 respectively. The vertical end sections of the filter walls 24, 26 shown on the right in the drawing are injection-moulded into a vertical rear wall component 32, and the vertical edges of the filter walls 24, 26 shown on the left of the drawing have been embedded into the top section 16 in the course of attachment of the latter by injection-moulding.

Between the upper wall component 28 and the lower wall component 30 there run parallel thereto and at substantially the same distance from one another a number of central horizontal internal components, e.g., 34, 36, 38, so that a chamber construction having defined flow conditions is formed. The internal components are attached by their edges to the filter walls 24, 26 by injection-moulding in situ. Webs 40, 42, 44 are provided in the top section 16 in continuation of the internal components 34, 36, 38. The webs have wall surfaces disposed at a slight incline, whereas the lateral boundary surfaces of the apertures of the top section 16 are disposed in each case at an angle of about 45° in relation to the central plane of the filter insert 14, as is evident from FIG. 2.

By way of material for the top section 16, the wall components 28–32 and the internal components 34–38, use may be made not only of PUR (polyurethane) but also, in each case depending on the temperatures at which the filter insert is to be employed, synthetic material of textile design, or metal. Likewise the filter walls 24, 26 may consist not only of textile-type synthetic materials but also of metallic filter media, whereby the stated components may also be present as a composite and adhesion bonding for high temperatures may also be effected by the use of ceramic adhesive systems.

The filter insert described above has a high degree of mechanical stability and is characterised by effective shedding, in the course of backflushing, of filter cake that has built up on the outside of the filter walls 24, 26. Typical operating conditions in a dust filter may be characterised by the parameters listed below:

Temperature: 0°–250° C.

Dust loading of the air: 0.5–250 g/m$^3$

Specific filter surface loading: 40–240 m$^3$/m$^2$h

Low-pressure capacity: up to 2,500 Pa

Pressure-bearing capacity: 1.5–6 bar.

The filter insert described above exhibits a rectangular transversal cross-section. This makes it possible for rectangular filter casings to be filled very effectively, so that a considerably higher effective net filter surface is available in comparison with conventional filter bags or filter pockets.

Figure 4:
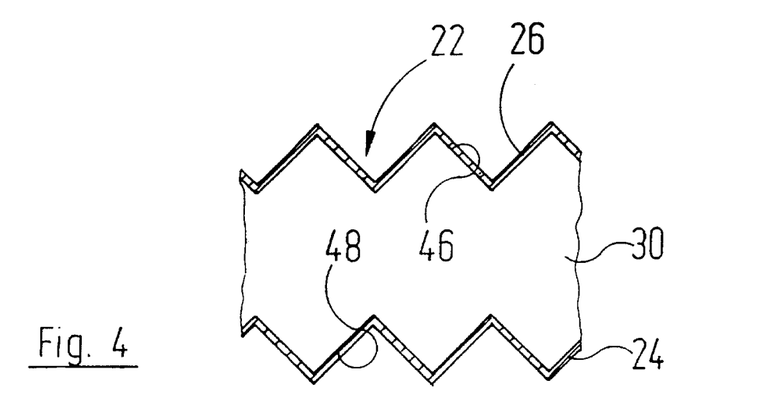
FIGS. 4 to 6 show in each case a view towards the junction between a filter wall that is folded in zigzag manner and a rigid wall component of a modified filter insert.

A filter insert constructed in accordance with the principle shown in FIG. 4 can be manufactured simply in differing sizes without the provision of differing injection moulds. A continuous material for the manufacture of the wall components 28, 30 and optionally 34–38 has lateral edges 46, 48 running in accordance with the fold of the filter walls 24, 26. This material can be manufactured as standard continuous material.

The lowest sections of the filter walls 24, 26 are bonded to the lateral edges 46, 48 by adhesion or welding.

The structure so obtained consisting of the filter walls 24, 26 and the horizontal wall components then needs only to be provided at the rear with the wall component 32, it also being possible to effect this by adhesion bonding, and then a top section 16 is also attached by adhesion bonding.

Figure 5:
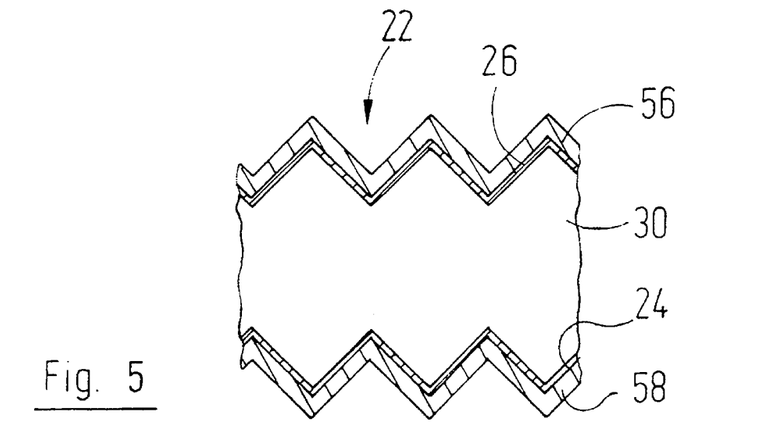

In the case of the modified embodiment according to FIG. 5 the wall component 30 is attached to the lower ends of the filter walls 24, 26 by injection-moulding or by casting and has lateral external edges 56, 58 raised above the lower ends of the wall components and joined to the latter by injection-moulding or by casting.

Figure 6:
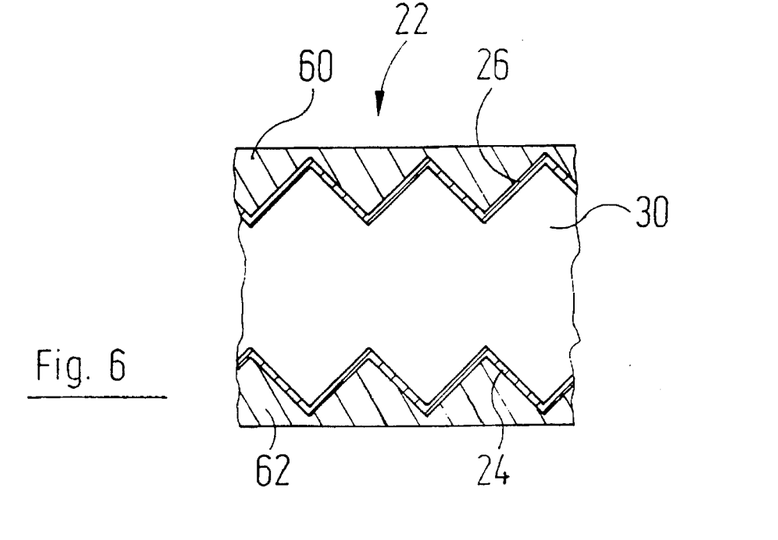

In the case of the embodiment according to FIG. 6 the wall component 30 is rectangular when seen in top view and has raised edges 60, 62 which essentially constitute a stringing-together of triangles, the edges being joined to the lower ends of the wall components 28, 30 by injection-moulding or by casting.

It will be understood that the upper wall components 28 are designed so as to be symmetrical with respect to the lower wall components 30.

Figure 7:
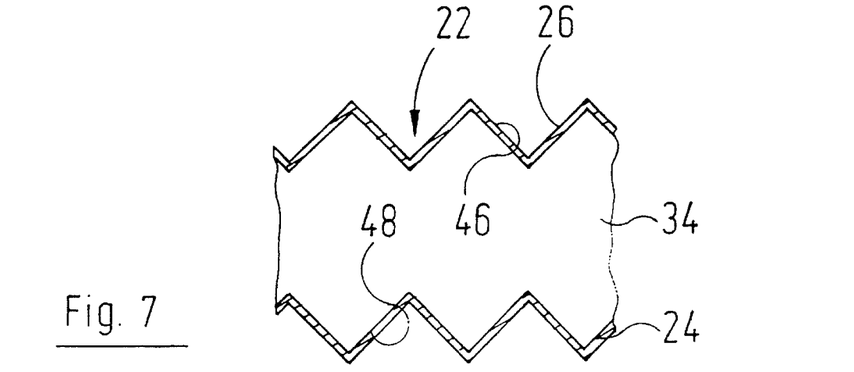
FIGS. 7 to 10 show in each case a view towards the junction between a filter wall that is folded in zigzag manner and a rigid internal component of a modified filter insert.
Figure 8:
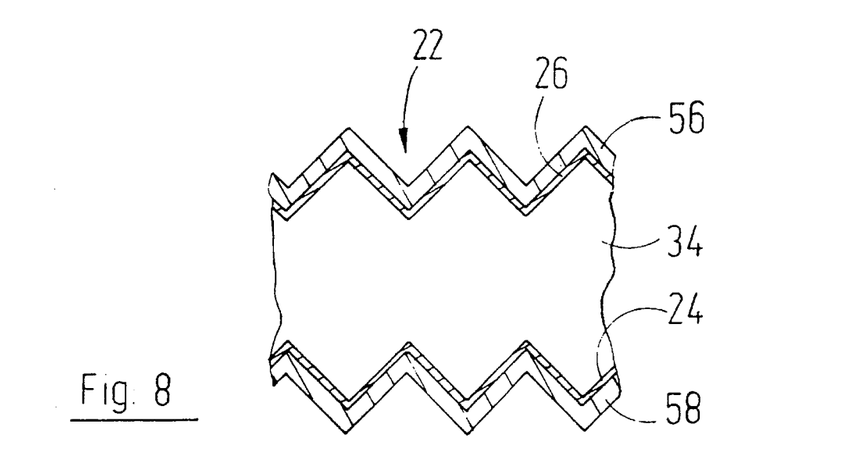

It will further be understood that the internal components 34, 36, 38 that are provided in various intermediate positions between the wall components 20 and 30 may be designed in a manner analogous to the wall components 30 shown in FIGS. 4–6, whereby the edges 56, 58 and 60, 62, if provided, are provided symmetrically with respect to both sides of the central surfaces of the internal components 34–38. In this regard FIGS. 7 and 8 should be viewed as corresponding to FIGS. 4 and 5.

Figure 9:
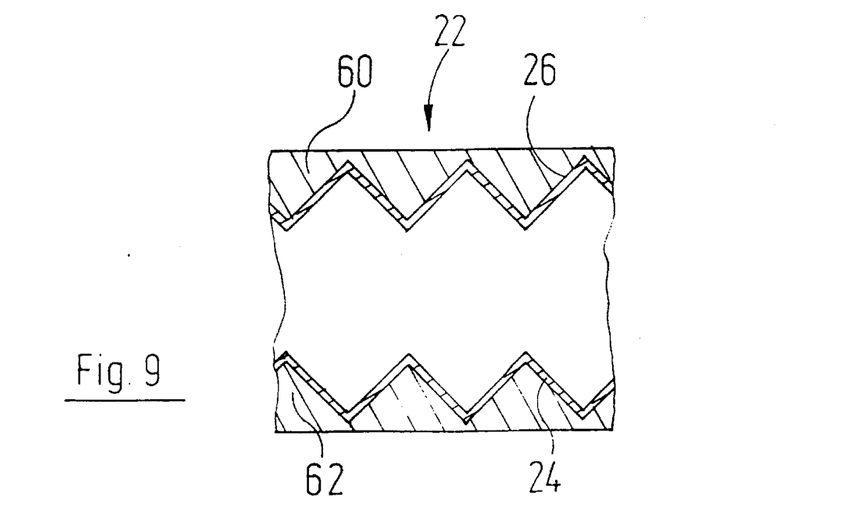

By way of modification to the above it is also possible, in the case of the internal components 34–38 according to FIG. 9, for the walls partitioning the interior of the filter insert to be omitted if desired. Furthermore, the filter walls 24, 26 can be reinforced at points located between the wall components 28, 30 by means of strips that are injection-moulded or cast onto the outside of the filter walls, the geometry of the strips corresponding to that of the edges 56, 58 or 60, 62.

Figure 10:
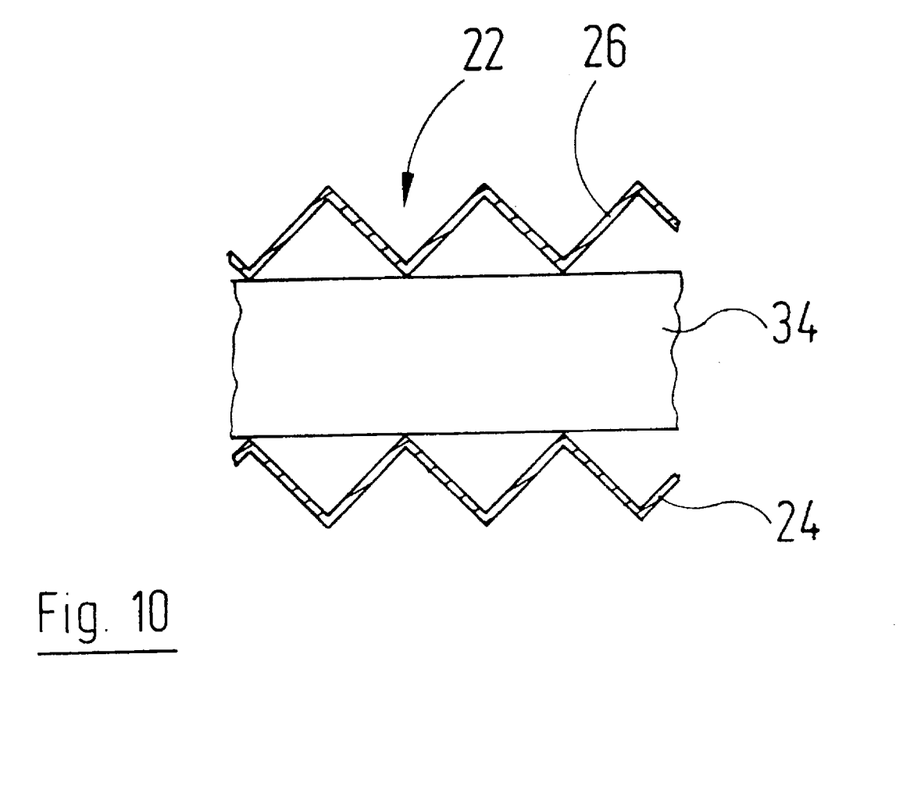

Furthermore it is also possible according to FIG. 10 for the internal components 34–38 to be so designed that they only ensure support against pressure loads but the coherence of flow of the entire interior of the filter insert continues to be ensured.

Figure 11:
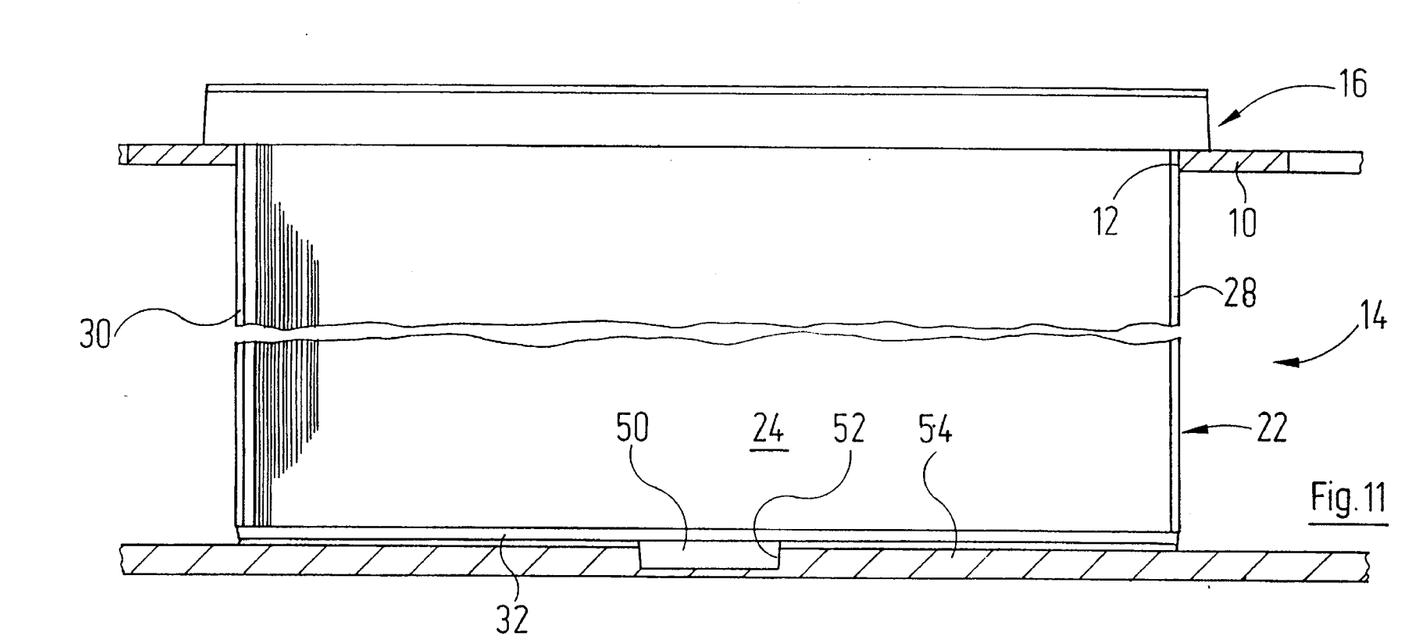
FIG. 11 is a side view of a filter insert which has been further modified so as to be designed for vertical installation, similar to FIG. 1.
Figure 12:
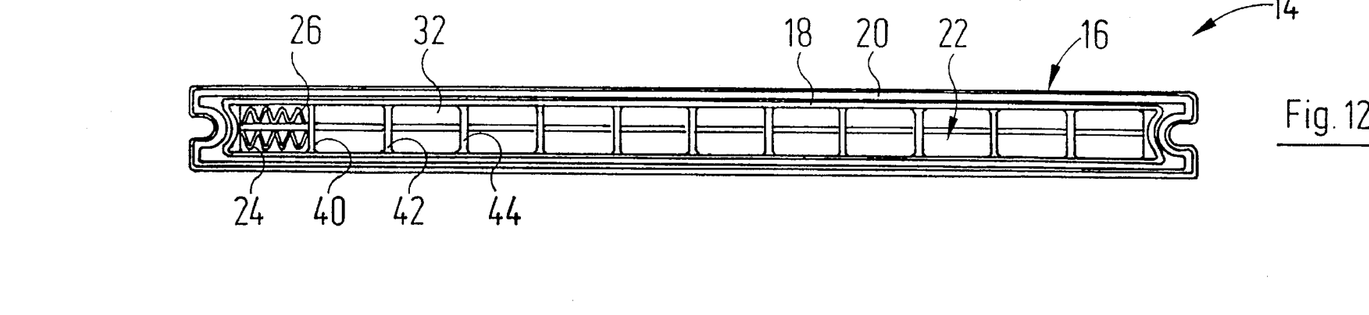
FIG. 12 is a view towards the front of the filter insert shown at the top of FIG. 11.
Figure 13:
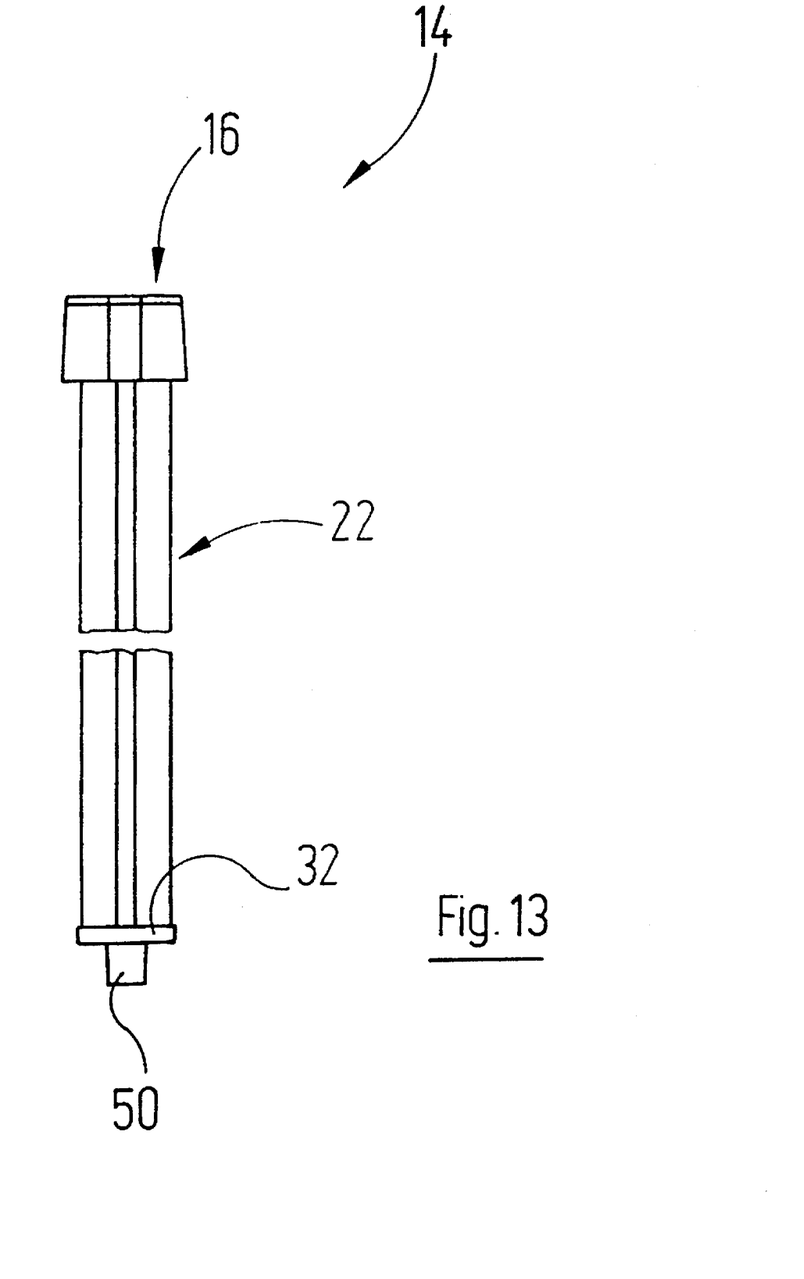
FIG. 13 is a side view of the filter insert according to FIGS. 11 and 12.

In the case of the filter insert shown in FIGS. 11–13 the components of the insert that correspond functionally to components already described above are provided with the same reference numbers.

The filter insert shown in FIGS. 11–13 is intended for vertical installation both from the purified-gas side and from the crude-gas side, and in order to position the lower end of the filter insert 14 by force in the event of the filter walls 24, 26 having large vertical dimensions a positioning spigot 50 is moulded onto the wall component 32. The positioning spigot interacts with a positioning recess 52 that is provided on a lower container wall of the filter casing.

Figure 2:
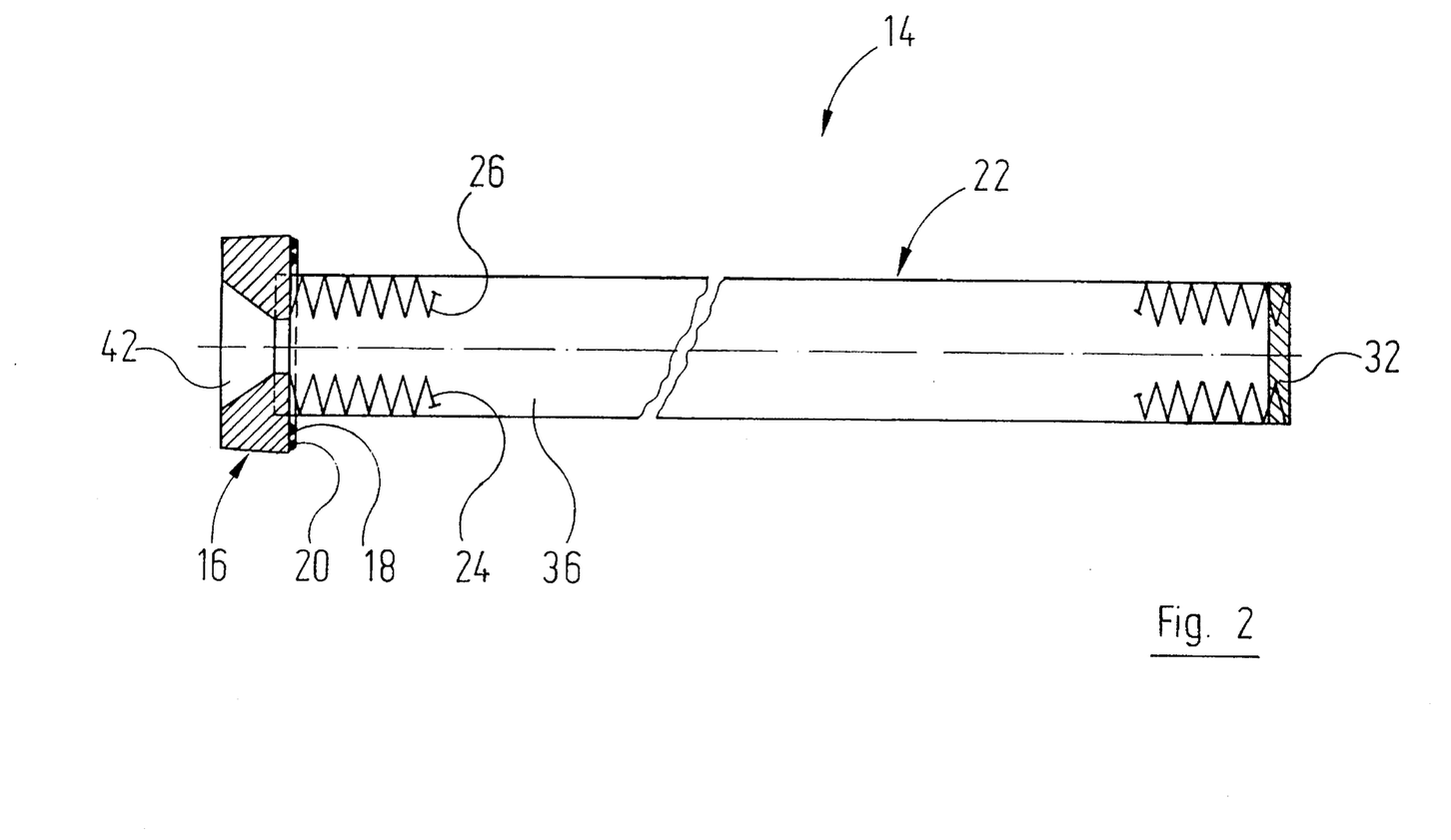
FIG. 2 is a horizontal section view through the filter insert shown in FIG. 1.
Figure 3:
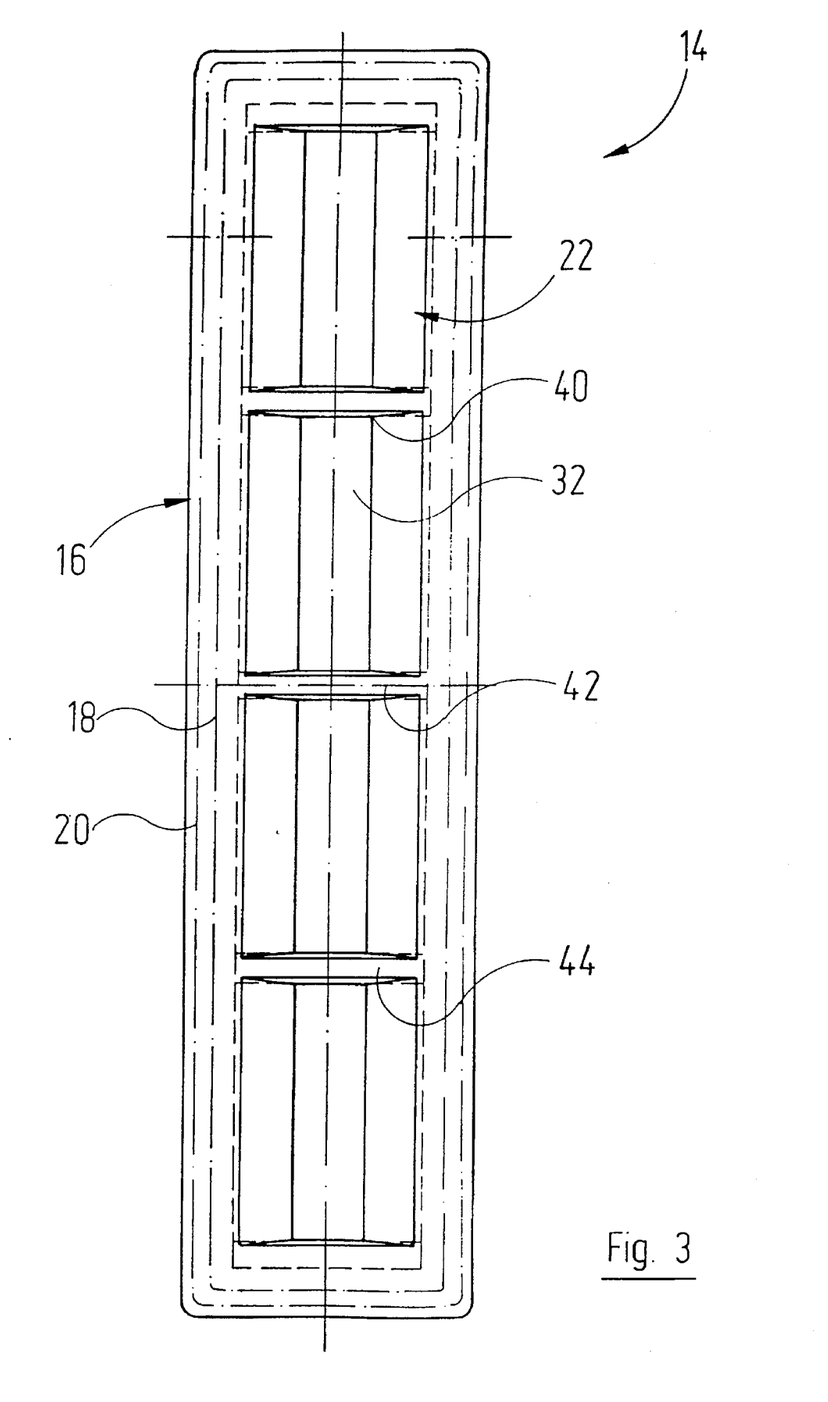
FIG. 3 is a side view towards the front of the filter insert as shown on the left side of FIG. 1 according to FIGS. 1 and 2.

A possible further difference of the filter insert according to FIGS. 11–13 from the filter insert according to FIGS. 1 and 2 consists in that this filter element is intended to be attached to the perforated plate from the dust side. Sealing ribs 18, 20 are provided on the end face of the top section 16 on the perforated-plate side to facilitate the attachment.

Injection molded components are preferably made from PUR (polyurethane).

Although the present invention has been described and illustrated in detail, it should be clearly understood that the same is by way of illustration and example only and is not to be taken by way of limitation, the spirit and scope of the present invention being limited only the terms of the appended claims.

What is claimed is:

1. A back-flushable filter insert, comprising:

(a) a top section having means for attaching to a perforated plate of a filter casing;

(b) a pocket-shaped filter section fixed tightly against the top section, the filter section comprising (i) two lateral filter walls each folded in a zig-zag manner, (ii) an upper inherently rigid wall component, (iii) a lower inherently rigid wall component, and (iv) a rear inherently rigid wall component, wherein the filter walls and the wall components are connected to one another and to the top section in a fluid-tight and mechanically loadable structure to maintain a high degree of mechanical stability, both during application of a relatively low pressure to the filter insert during filtration and also during application of a relatively higher pressure to the filter insert during backflushing, and at least one central internal component supporting the filter walls and positioned between the upper inherently rigid wall component and the lower inherently rigid wall component.

2. A filter insert as claimed in claim 1, wherein:

the inherently rigid wall components each comprise at least one of either an injection-molded material or a cast material.

3. A filter insert as claimed in claim 2, wherein:

the wall components comprise a synthetic material.

4. A filter insert as claimed in claim 2, wherein:

the wall components are injection moulded or cast onto the filter walls.

5. A filter insert as claimed in claim 1, wherein:

the central internal component is arranged to be substantially parallel to the lower wall component.

6. A filter insert as claimed in claim 1, wherein:

the internal component is made integral with the wall components.

7. A filter insert as claimed in claim 1, wherein:

at least some of the rigid wall components have edge faces whose configurations match the configurations of corresponding filter walls to which said edge faces respectively abut.

8. A filter insert as claimed in claim 7 wherein:

the filter walls each have a zigzag configuration, and the configurations of some of the edge faces of the wall components which respectively engage with the filter walls are such as to enable engagement with the zigzag edges of the filter walls.

9. A filter insert as claimed in claim 7, wherein:

the edge faces of said at least some wall components are attached to the filter walls by one of bonding, welding or casting in place.

10. A filter insert as claimed in claim 1, wherein:

an aperture is formed in the top section, the aperture leading to the interior of the filter section and being tapered outwardly with increasing distance from the filter section.

11. A filter insert as claimed in claim 10, wherein:

the aperture has substantially planar divergent lateral wall surfaces.

12. A filter insert as claimed in claim 1, wherein:

the rear wall component bears an engaging element formed to cooperate with a corresponding casing element to support the rear wall component.

13. A filter insert as claimed in claim 1, further including:

circumferential sealing means provided on one of the end faces of the top section.

\* \* \* \* \*